June 16, 1964   H. H. SEWARD   3,137,794
DIRECTIONALLY SENSITIVE LIGHT DETECTOR
Filed June 28, 1960   2 Sheets-Sheet 1

*INVENTOR.*
HAROLD H. SEWARD
BY
Weingarten, Oranbuch & Pandiscio
ATTORNEYS

United States Patent Office 3,137,794
Patented June 16, 1964

---

3,137,794
DIRECTIONALLY SENSITIVE LIGHT DETECTOR
Harold H. Seward, Burlington, Mass.
(16 Frost St., Arlington, Mass.)
Filed June 28, 1960, Ser. No. 39,384
8 Claims. (Cl. 250—216)

This invention relates in general to electro-optical apparatus and more particularly concerns means for providing an electrical signal output indicative of the angular deviation of luminous rays received from a light source and a predetermined reference direction.

Devices capable of indicating the position of a light source with respect to some fixed reference point are, of course, useful in a variety of applications. For example, means for determining the angle of elevation, in a given direction, of a light source with respect to a plane occupying a known position, find wide utility in navigational instruments. In such apparatus, high sensitivity of angle definition represents increased precision in determining the navigational position. Another useful application of a highly sensitive directional indicator for light sources is in the construction of differential refractometers. A differential refractometer measures the index of refraction of a substance by determining the angle of emergence of a collimated and preferably monochromatic light beam incident upon a cell containing the substance and comparing this with the angle of emergence of the same light beam from a cell containing a substance of known index of refraction. Refractometers are extensively used as analytical tools in the study of compounds wherever varying refractive index may furnish a useful control signal. Typically the salinity of water may be detected and controlled by such techniques.

The usual method of determining the angular direction involves the use of cumbersome lens and telescope combinations, often with relatively long optical paths. By arranging two such devices so that the angular position of a light source in each of two planes normal to one another may be determined, the combination will yield complete information as to the exact angular orientation of the light source with respect to the detector. Thus, paired angle-sensing telescopes have been embodied in instruments for celestial observations and photography and are frequently operated in conjunction with a servo-tracking system to maintain a precise bearing on the celestial body. Where so utilized, extreme sensitivity in terms of sensitivity to small deviations from a predetermined angle of light incidence, rather than a linear response over a wide angular range, is highly desirable.

It is therefore a primary object of the present invention to provide a novel electro-optical directionally sensitive light detector, of exceedingly simplified structure, which may be fabricated from relatively low-cost, readily available components.

It is another object of the present invention to provide a small, compact, light detector having extremely high angular sensitivity yielding an easily detected electrical output signal indicative of the angular direction of incident light.

It is still another object of the present invention to provide an economical, compact device for precision measurement of the direction of incident light and having an electrical output signal indicative of this direction which is immediately useful for electromechanical control purposes.

Broadly speaking, the sensor device of the present invention employs a prism of particular characteristics operated in conjunction with a pair of photosensitive elements, or photocells. The outputs of the photocells are connected to an electrical differential circuit which in turn provides an output signal having a polarity determined by the position of a light source with respect to the prism bisecting plane and an amplitude indicative of the angular deviation between the prism bisecting plane and the plane in which the light source lies. The prism is formed such that the angle between each side face of the prism and the hypotenuse face is equal to the critical angle of the prism material for light of a wave length generated by the light source. When this condition is met, light which is incident on the hypotenuse face is totally reflected from the internal side faces of the prism, whereas light incident upon the hypotenuse face at an angle other than normal strikes one of the internal side faces at an angle less than critical and a significant amount of light is refracted through that face. One photocell is placed in a plane parallel to one side face and in close proximity to it, while the other photocell is placed in a similar position with respect to the other side face of the prism. Light from a source which is located in a plane above the bisecting plane of the prism strikes the lower internal side face at an angle less than critical, and the photocell positioned behind it provides a signal indicative of the amount of light refracted through this face. On the other hand, light from a source below the bisecting plane of the prism drives at the upper internal side face at an angle of incidence less than the critical angle and provides a signal output on the photocell in proximity to this face. When the light source is an extended source located in the prism bisecting plane, then both photocells will provide a signal output due to the fact that there is some light refracted through each side face. However, these outputs are equal and, hence, balance one another in the differential circuit. In the case of an extended light source located on one side of the prism bisecting plane, however, not only is the signal from the appropriate photocell increased by the increase of light refracted through its corresponding prism face, but also the signal from the other photocell is decreased because, in this circumstance, even less light arrives at its corresponding face at an angle less than critical, than arrived when the same light source was in the prism bisecting plane.

Other objects and advantages of the present invention will become apparent from the following detailed description when taken in conjunction with the accompanying drawing in which.

Figure 1:
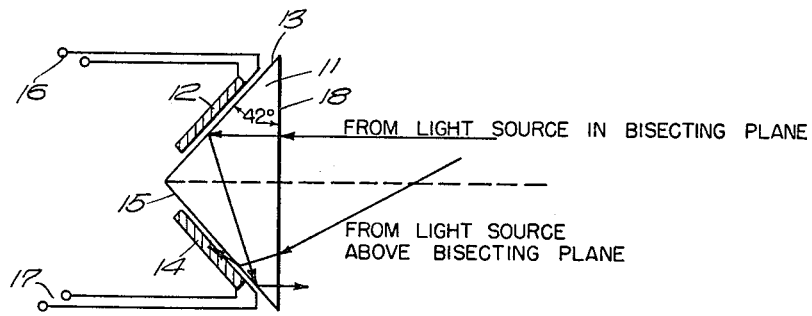
FIG. 1 is a diagrammatic view of the sensor unit of this invention.

With reference now specifically to FIG. 1, a prism 11 is shown with a first planar photocell 12 located in a plane parallel to and in close proximity with one of its side faces 13 and a second planar photocell 14 located in a similar position with respect to the second side face 15. Photocell 12 is wired to a pair of electrical output terminals 16 and photocell 14 is similarly joined to a pair of electrical output terminals 17.

The angle between the hypotenuse face 18 of the prism and each of the side faces 13 and 15 is selected, as previously indicated, to be equal to the critical angle of the light from the light source within the prism. For example, if the prism is formed from conventional crown glass and the light from the light source is primarily in the one micron wavelength region, then the critical angle is 41.5°, or approximately 42°; hence the prism is cut so that the angle between each of the side faces 13 and 15 and the hypotenuse face 18 is this angle. Inasmuch as the critical angle is a function of wavelength, the exact cut of the prism will be dependent on the light being detected. For illustrative purposes, the critical angle has been shown as 42° in the drawing.

As illustrated, a ray incident on the prism face 18 at an angle normal to the plane of this face will be totally reflected by the internal side faces of the prism, while light from a source so oriented that the angle of incidence on either one of the side faces 15 or 13 is less than the critical angle will be partially refracted through the appropriate side face and will strike the corresponding photocell.

The photocells 12 and 14 may be any conventional form providing an electrical signal output in response to incident light, typical photocell materials being silicon crystals or lead selenide. In a representative embodiment of a sensor unit, as illustrated in FIG. 1, each side face of the prism might be one-half inch by one-half inch square, with each photocell having a planar area of one-sixteenth square inch, and a thickness of one-sixteenth of an inch. Since the critical angle of the material is defined with respect to an interface between the prism and air, the photocell surfaces are not placed in physical contact with the surfaces of the prism, but rather are spaced at a short distance, for example, one one-thousandth of an inch. It is, however, advantageous to have the photocells located as close as possible to the faces 13 and 15 of the prism since in general the refracted light emerges from the prism in a path very close to the surface of the glass.

Figure 2:
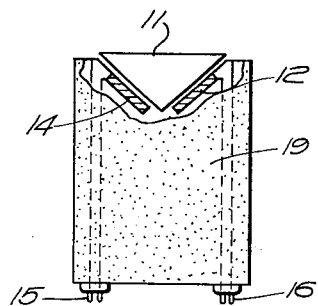
FIG. 2 is a cross-sectional view of sensing apparatus embodying the principles of this invention.
Figure 2A:
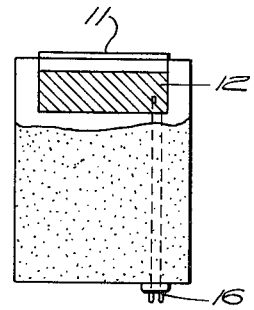
FIG. 2A is a cross-sectional view of the apparatus of FIG. 2 taken in a plane rotated 90° from that of FIG. 2.

Referring now to FIG. 2, a sensor embodying the element illustrated in FIG. 1 is shown in cross-sectional view with like reference numerals referring to like parts. The prism and photocell combination is enclosed within a cylinder of opaque potting compound 19, thereby providing both electrical insulation and a light seal for the prism and photocells with only the hypotenuse face of the prism being exposed to incident light. As illustrated in FIG. 2, the potting compound is not flowed into the space between the photocells and the prism, but rather an air space is left in this area in order to provide, as above indicated, for total reflection at the critical angle of the prism material. In a single prism device, as illustrated in FIGS. 2 and 2A, the difference in signal outputs on terminals 16 and 17 provides a highly sensitive indication of the angle defined between the direction of the incident light and the normal to the hypotenuse face of the prism in one plane.

Figure 6:
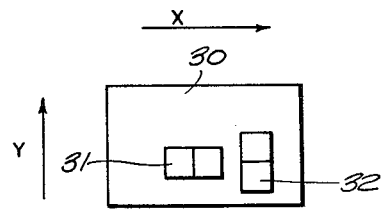
FIG. 6 is a view of the front surface of sensing apparatus embodying the principles of this invention for determination of the angle of incident light in each of two perpendicularly intersecting planes.

Referring now to FIG. 6, a unitary structure 30 is shown incorporating two sensor prism arrangements 31 and 32, respectively, with sensor prism 32 being disposed normally of sensor prism 31. Each of the sensor devices 31 and 32 may be essentially of the electro-optical configuration hown in FIG. 1, the photocells and output terminals not being shown in FIG. 6. The hypotenuse faces of both prisms are coplanar.

The differential output of the photocells operating in conjunction with sensor prism 31 provides an indication of the angle of incident light with respect to the hypotenuse face of prism 31 in the XZ plane, the Z axis tending normal to the drawing, while the differential output of the photocells operating in conjunction with sensor prism 32 provides a signal indicative of the angle of incident light with respect to the hypotenuse face of prism 32 in the YZ plane. By appropriately combining the differential outputs from each pair of photocells, a signal indicative of the angular orientation of the incident light with two-dimensional definition is provided.

Since the rays from a light source located at a large distance from the sensor are effectively parallel or collimated rays, all of the incident light will strike the face of the sensor at the same angle and the differential outputs from each pair of photocells may then be combined to provide a signal indicative of the position of the light source with respect to the hypotenuse faces of the pair of prisms.

Figure 3:
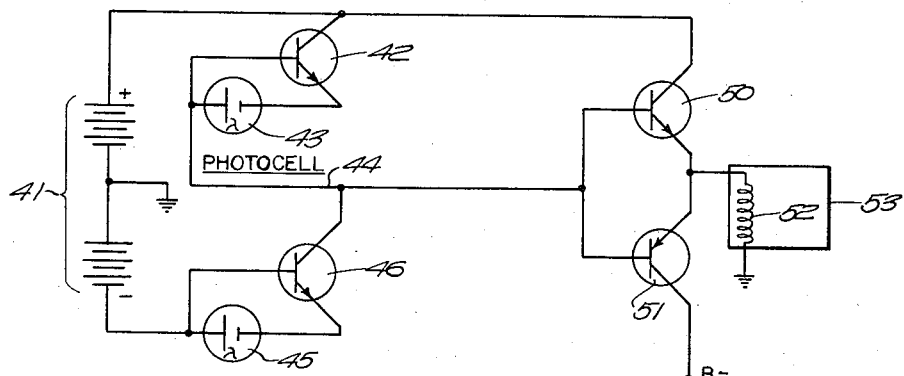
FIG. 3 is an illustration in schematic form of a differential circuit suitable for operation in accordance with the principles of this invention.

Referring now to FIG. 3, a schematic illustration is shown of a differential circuit suitable for operating in conjunction with a pair of photocells to provide relay actuation in one direction when the signal from one photocell is larger and in the opposite direction when the signal from the other photocell is larger. A center grounded voltage source 41 has its positive terminal connected to the collector of transistor 42. Photocell 43 has one electrode coupled to the emitter of transistor 42 and its second electrode coupled to the base of transistor 42 and also to junction 44. The negative terminal of voltage supply 41 is coupled to one electrode of a second photocell 45, the same electrode being connected directly to the base of a transistor 46, which transistor has its emitter connected to the second electrode of photocell 45 and its collector coupled to junction 44. Junction 44 is also electrically connected directly to the bases of transistors 50 and 51. Transistors 50 and 51 have their emitters connected in common through coil 52 of polarized relay 53 to ground. The collector electrode of transistor 50 is coupled to the positive terminal of voltage supply 41 while the collector of transistor 51 is connected to a negative voltage source B—, the positive terminal of which (not shown) is grounded. The overall operation of this circuit is such that current generated in response to light incident on photocell 43 has one polarity at junction 44 while current generated in response to light incident on photocell 45 has the opposite polarity at this junction, and hence the resultant polarity and value of current at junction 44 indicates which photocell is receiving the larger quantity of light and the entent of the quantitative difference in light between the two photocells. The polarized relay 53 acting in conjunction with transistor 50 and 51 is aranged so that one set of contacts is closed if the excess of light is incident on photocell 43, while the other set of contacts is closed if the excess of light is incident upon photocell 45. These relay closures may then be used in conjunction with a servo system to maintain the orientation of a sensor such as indicated in FIG. 1, in a null position relative to the direction of light from a light source, where any light refracted to the photocells is refracted equally to each cell.

Figure 4:
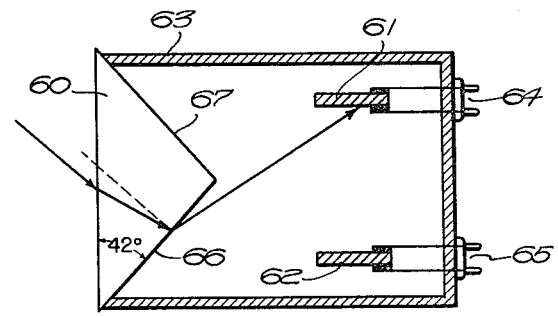
FIG. 4 is an illustration partly in cross-sectional form and partly in diagrammatic form of a second embodiment of this invention.

In FIG. 4 a light directional sensor unit is shown which operates on the same principles as heretofore described but in which the configuration of the photocells with respect to the prism is somewhat different. A prism 60, having the same characteristic in regard to angle of incidence as previously described, is mounted with its side faces enclosed within a light tight housing 63, while the hypotenuse face is outwardly exposed. A pair of photocells 61 and 62 are also included within housing 63, and each is electrically coupled through a light tight seal to its respective pair of terminals 64 and 65, the terminals being disposed on the external surface of the housing 63.

In the sensor unit illustrated in FIG. 4, the photocells are not located in planes parallel to the side faces of the prisms but rather the planar faces of both photocells are located in planes normal to the hypotenuse face of the prism 60 and on opposite sides of the plane which perpendicularly bisects the hypotenuse face. Photocell 61 is located behind the side face 67 of prism 60 at a point such that light rays refracted from side face 66 in a direction nearly parallel thereto will be collected by it, and similarly photocell 62 is located in equivalent position with respect to light rays refracted from side face 67 of prism 60. Since, as previously mentioned, the refraction angle for light incident on the side face at an angle near the critical angle is nearly 90°, then this configuration provides for highly efficient light collection since all light emitted, even at angles approaching 90°, will fall upon the appropriate photocell. Thus, the signal generated by light arriving at a particular deviation from normal will be maximized employing this configuration and therefore the angular sensitivity of the overall unit is enhanced. In addition, by placing the cells away from the prism, unwanted stray light may be significantly reduced.

Figure 5:
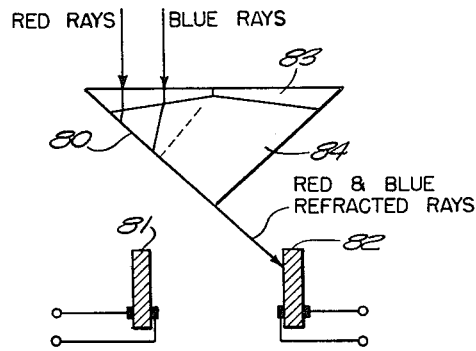
FIG. 5 is an illustration in diagrammatic form of another embodiment of this invention.

The previous description has assumed that the incident light was primarily monochromatic and hence presented no problems due to the variation in critical angle with the wavelength of incident light. However, when the incident light beam has several wavelength components, a simple prism as previously described will no longer have as high a precision of directionality since the critical angle for rays in, for example, the blue region will differ from the critical angle for rays in the red region. One method of overcoming this difficulty is to provide conventional light filters interposed between the light source and the hypotenuse face of the prism such that only light of a particular wavelength is incident upon the prism. This method has the disadvantage of reducing the light intensity incident upon the prism and hence of that refracted to the photocells thereby decreasing the overall sensitivity. In FIG. 5 a sensor unit in accordance with the principles of this invention and employing an achromatic prism is diagrammatically illustrated. A pair of photocells 81 and 82 are located in respect to the side faces of a prism 80 in the same configuration as was employed in the sensor unit illustrated in FIG. 4. In this instance, however, the prism 80 is an achromatic prism formed with a hypotenuse face composed of dispersive flint glass 83 with the remainder of the prism 84 formed of crown glass. In this prism, light rays in the red region incident upon the hypotenuse face emerge from the dispersive glass with less angular deviation than do blue rays incident upon the hypotenuse face at the same angle. This difference in angle of deviation of the red and blue rays results in an angle of incidence upon the side face of the prism for red rays which is different than that for blue rays, and the difference is such that for light normal to the hypotenuse face both the red and blue rays strike the glass-air boundary at their respective critical angles. The overall effect then is to provide the same high directional sensitivity and refracted angle for incident rays over a fairly wide spectrum of wavelengths.

While the invention has been described above in terms of a glass prism disposed within an air medium, the principles described will apply equally to a variety of prism materials radiation wavelengths and media, requiring only that the index of refraction of the prism material be larger than the index of refraction of the medium in which the prism is disposed. Again, while particular dimensions were described, these were by way of example, and it is apparent that the sensor units can be constructed in other sizes depending upon the particular application. In view of the fact, therefore, that numerous modifications and departures may now be made by those skilled in the art, the invention herein should be construed as limited only by the spirit and scope of the appended claims.

The invention described herein may be manufactured and used by or for the Government of the United States of America for governmental purposes without the payment of any royalty thereon or therefor.

What is claimed is:

1. Electro-optical apparatus comprising a refractive element having a first surface adapted to receive externally incident illumination and second and third mutually intersecting planar surfaces each intersecting said first surface at the critical angle, and first and second photo-sensitive means adapted selectively to receive such of said incident illumination as emerges from said second and third surfaces, respectively.

2. Electro-optical apparatus in accordance with claim 1 wherein said first and second photo-sensitive means comprise substantially planar photo-electric cells disposed closely adjacent and substantially parallel to said second and third surfaces, respectively.

3. Electro-optical apparatus is accordance with claim 2 and including electrical means for differentially combining the signal outputs of said photo-electric cells.

4. Electro-optical apparatus in accordance with claim 2 wherein said second and third surfaces of said refractive element and said photo-electric cells are opaquely enclosed, said first surface being exposed to receive said illumination.

5. Electro-optical apparatus in accordance with claim 1 and including means for rendering said refractive element achromatic whereby said critical angle is substantially independent of wavelength of said incident illumination throughout a relatively broad spectrum.

6. Electro-optical apparatus comprising a pair of refractive elements each having a first surface adapted to receive externally incident illumination and second and third mutually intersecting surfaces each intersecting the respective first surface at the critical angle, each of said refractive elements having associated therewith first and second photo-sensitive means adapted selectively to receive such of said incident illumination as emerges from the respective second and third surfaces, said first surfaces of said refractive elements being coplanar, the intersection of said second and third surfaces of one of said refractive elements of said pair being substantially perpendicular to the corresponding intersection of the other.

7. Electro-optical apparatus comprising, a refractive element having a directional axis and at least first and second planar faces, said refractive element being arranged to receive luminous energy within a limited range of angles disposed about said directional axis, means for directing said luminous energy when received parallel to said directional axis to impinge internally upon said first and second faces at the critical angle and for directing luminous energy when received at an angle within said limited range other than parallel to said directional axis to impinge internally upon one of said first and second faces at an angle greater than the critical angle and on the other at an angle less than the critical angle, and first and second photosensitive means for receiving luminous energy refracting through said first and second faces respectively.

8. Electro-optical apparatus as in claim 7 and including means for differentially combining the outputs of said first and second photo-sensitive means.

References Cited in the file of this patent

UNITED STATES PATENTS

| 1,935,427 | Alexanderson | Nov. 14, 1933 |
| 2,359,787 | Peters et al. | Oct. 10, 1944 |
| 2,403,023 | Reynolds | July 2, 1946 |
| 2,674,700 | Small | Apr. 6, 1954 |
| 2,829,363 | Obermaier et al. | Apr. 1, 1958 |
| 2,837,960 | Miller | June 10, 1958 |
| 2,952,781 | Hersh | Sept. 13, 1960 |
| 2,964,636 | Carey | Dec. 13, 1960 |